(12) United States Patent
Biancalana

(10) Patent No.: US 10,843,533 B2
(45) Date of Patent: Nov. 24, 2020

(54) OPEN-TOP AUTOMOBILE

(71) Applicant: FERRARI S.p.A., Modena (IT)

(72) Inventor: Matteo Biancalana, Modena (IT)

(73) Assignee: FERRARI S.P. A., Modena (IT)

( * ) Notice: Subject to any disclaimer, the term of this patent is extended or adjusted under 35 U.S.C. 154(b) by 30 days.

(21) Appl. No.: 16/261,011

(22) Filed: Jan. 29, 2019

(65) Prior Publication Data
US 2019/0241047 A1    Aug. 8, 2019

(30) Foreign Application Priority Data

Jan. 31, 2018  (IT) ................. 102018000002281

(51) Int. Cl.
*B60J 1/20* (2006.01)
*B60J 1/02* (2006.01)
*B62D 35/00* (2006.01)

(52) U.S. Cl.
CPC ............. *B60J 1/2005* (2013.01); *B60J 1/02* (2013.01); *B62D 35/005* (2013.01)

(58) Field of Classification Search
CPC ..... B60J 1/02; B60J 1/20; B60J 1/2005; B60J 7/22; B62D 35/00; B62D 35/005
USPC .................................................. 296/91, 180.1
See application file for complete search history.

(56) References Cited

U.S. PATENT DOCUMENTS

| 1,334,811 | A |   | 3/1920 | Smith |  |
|---|---|---|---|---|---|
| 5,630,640 | A | * | 5/1997 | Fior | ............................ B60J 7/22 |
|  |  |  |  |  | 296/91 |
| 7,703,831 | B2 | * | 4/2010 | Matsuo | .................... B62J 17/04 |
|  |  |  |  |  | 296/78.1 |
| 10,577,034 | B2 | * | 3/2020 | Thompson | ............. B62D 37/02 |

FOREIGN PATENT DOCUMENTS

| EP | 0731016 A1 | 9/1996 |
|---|---|---|
| JP | 1132491 U | 9/1989 |

OTHER PUBLICATIONS

International Search Report issued in Italian Patent Application No. IT 201800002281, completed Oct. 3, 2018; 7 pages.

* cited by examiner

*Primary Examiner* — Jason S Daniels
(74) *Attorney, Agent, or Firm* — Cantor Colburn LLP

(57) ABSTRACT

An open-top automobile includes an outer body, a passenger compartment in the outer body, and a driver area open at the front with respect to a travelling direction of the automobile. The outer body includes a flow surface that when the automobile is travelling is touched by a main air flow directed towards the driver area. The outer body includes a flow channel in front of the driver area having an inlet opening fed by the outside air when the automobile is travelling, and an outlet opening facing upwards. The flow channel is configured to generate, when travelling, a secondary air flow directed at the outlet opening transversely to the main flow and incident on this latter to divert it upwards and avoid a direct impact of the main air flow on the face of a driver in the driver area.

12 Claims, 4 Drawing Sheets

OPEN-TOP AUTOMOBILE

CROSS-REFERENCE TO RELATED APPLICATIONS

This patent application claims priority from Italian Patent Application No. 102018000002281 filed on Jan. 31, 2018, the entire disclosure of which is incorporated herein by reference.

TECHNICAL FIELD

The present invention relates to an open-top automobile, in particular of "barchetta" type, to which the following description will refer explicitly without thereby losing its generality.

PRIOR ART

"Barchetta" type automobiles have played a fundamental role in motor racing and competitions. This term refers to an automobile lacking roof, side windows or windshield. In practice, this is a completely open-top automobile.

The advantage of the absence of the windshield lies not only in the fact that it is one less component to manufacture and assemble, but also in the fact that the various devices and systems for cleaning, de-icing and defogging the windshield are no longer required, with obvious savings in terms of weight and costs.

The use of windbreaks in these types of automobiles in order to at least partially protect the driver and any passenger from the air flow while travelling is known. Windbreaks are stationary deflectors or diverters placed on the automobile body in front of the driver area and of a possible passenger seat.

The problem associated with the use of windbreaks is that they must necessarily have a small size, since, above all as regards the driver area, they must be kept below the visibility plan defined for the homologation of the automobile.

This generally results in limited effectiveness compared to a real windshield.

DESCRIPTION OF THE INVENTION

The object of the present invention is to provide an open-top automobile, in particular of "barchetta" type, which allows obviating the drawback described above in a simple and inexpensive manner.

According to the present invention, it is provided an open-top automobile, in particular of "barchetta" type, as claimed in claim 1 and in the dependent claims.

BRIEF DESCRIPTION OF THE DRAWINGS

The present invention will now be described with reference to the attached drawings showing a non-limiting embodiment, in which.

PREFERRED EMBODIMENTS OF THE INVENTION

Figure 1:
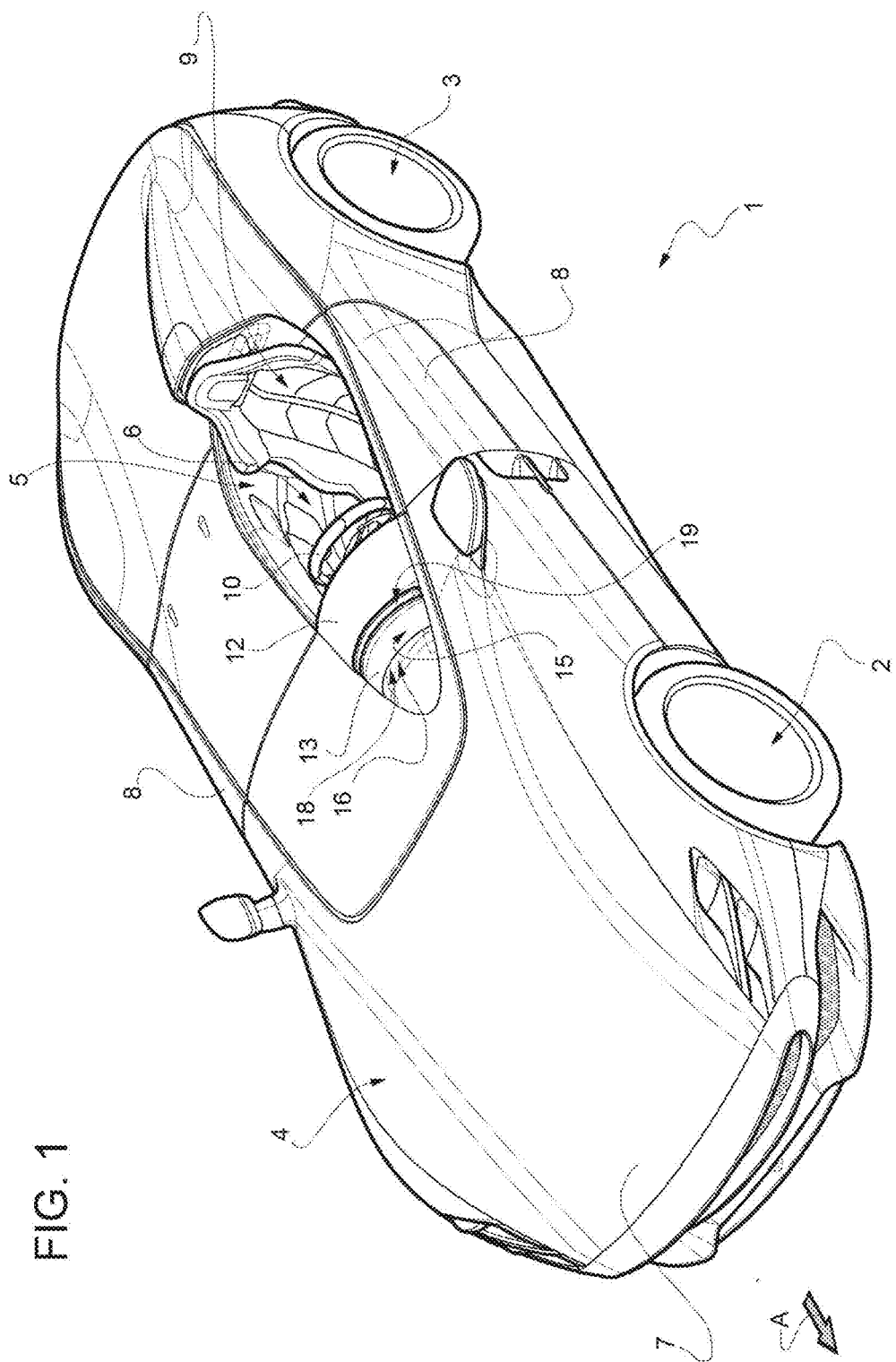
FIG. 1 shows, in a front perspective view, an open-top automobile made according to the dictates of the present invention.
Figure 2:
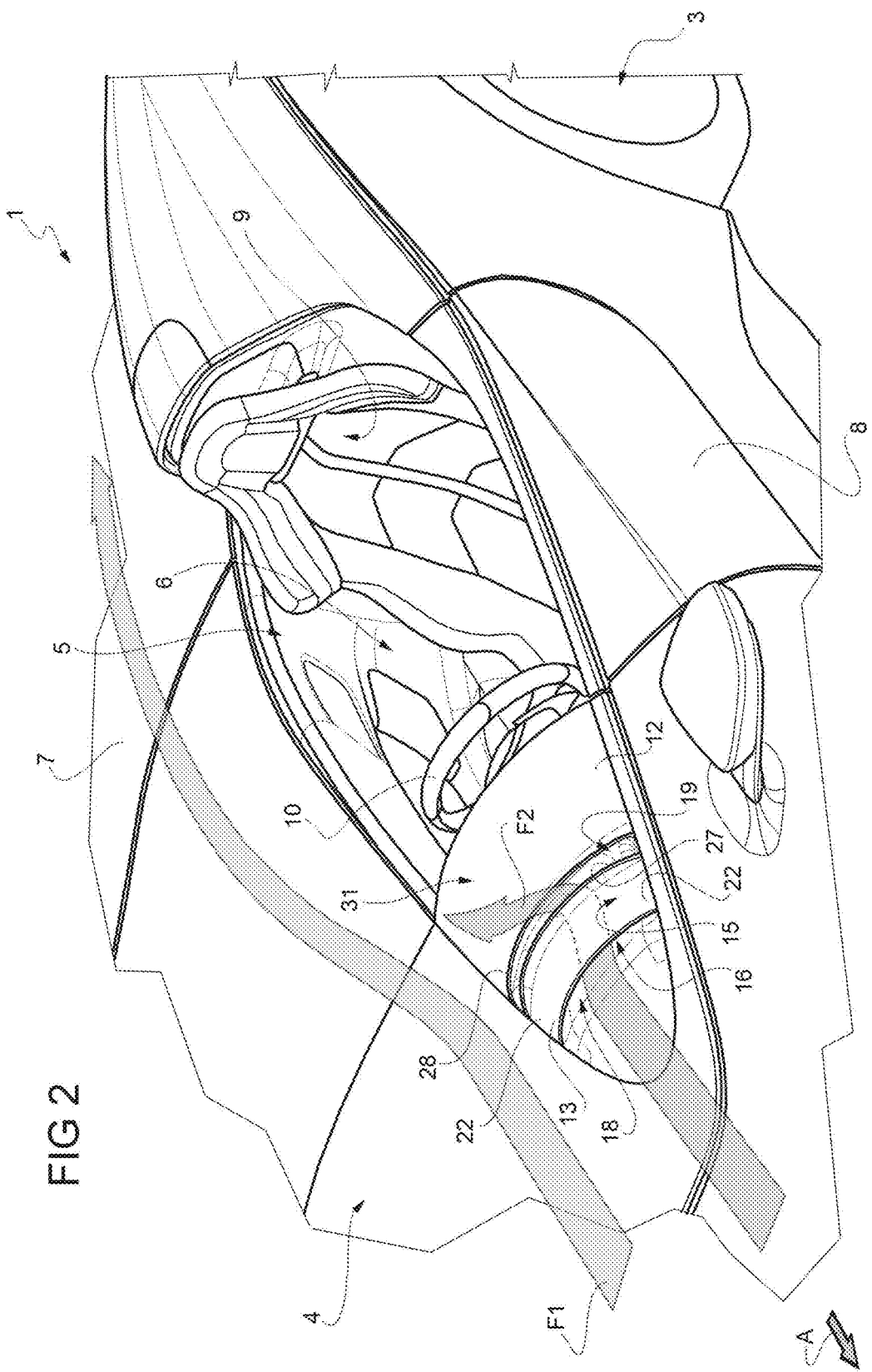
FIG. 2 shows, in a front perspective view and on an enlarged scale, a portion of the automobile of FIG. 1, showing the air flows that are formed when travelling.

In FIGS. 1 and 2, the reference number 1 indicates as a whole an open-top automobile of "barchetta" type, i.e. without a windshield, made according to the dictates of the present invention.

The automobile 1 has two front wheels 2 and two rear wheels 3 and comprises an outer body 4 and a passenger compartment 5 obtained inside the outer body 4 between the front and the rear wheels 2, 3.

In the shown example, the automobile 1 is a single-seater, so the passenger compartment 5 includes only a driver area 6 open frontally and laterally with respect to a travelling direction A of the automobile 1.

The present invention is applicable to any automobile without a windshield, including two-seater "barchetta" automobiles.

The outer body 4 includes a bodywork 7 and two side doors 8 to give access to the passenger compartment 5.

Figure 3:
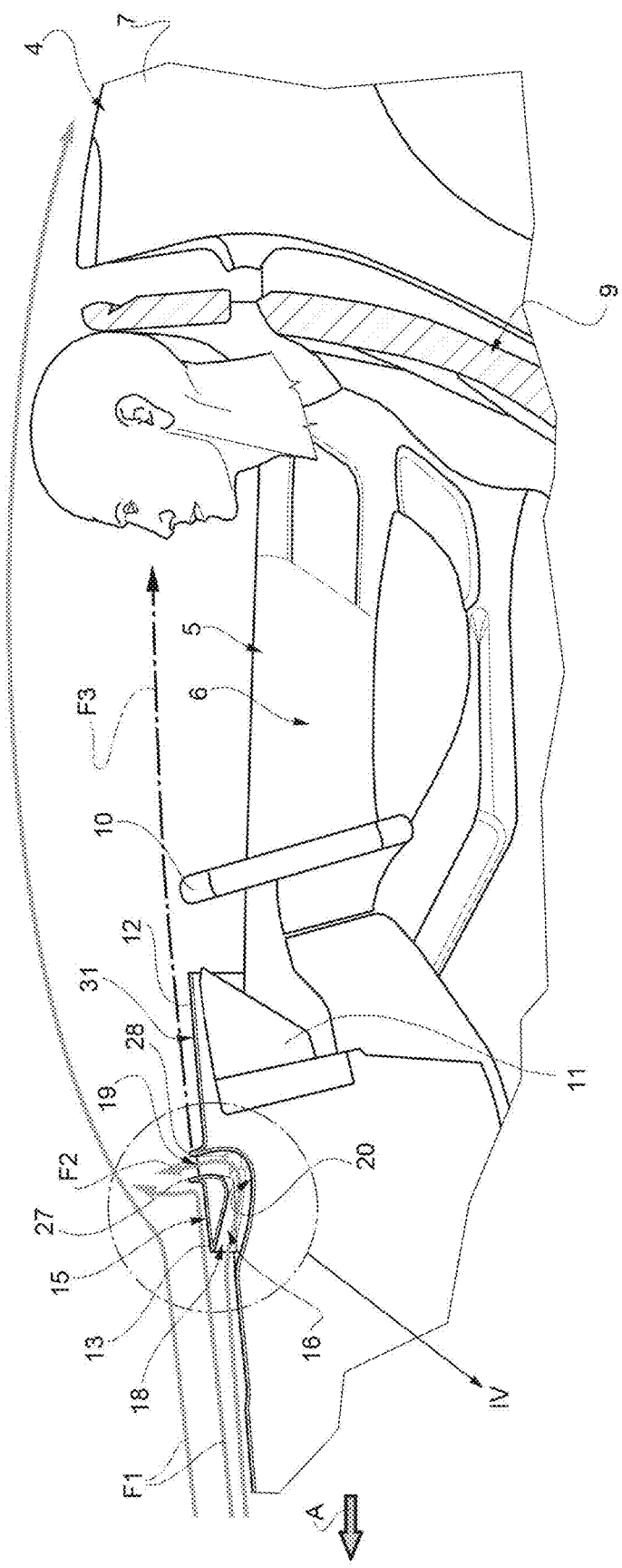
FIG. 3 shows, in a side view and in a partial longitudinal section, the portion of the automobile of FIG. 2 showing the air flows that are formed while travelling as well as their course with respect to the schematically represented driver's head.

The driver area 6 essentially comprises a seat 9 for the driver, a steering wheel 10 and a dashboard 11 (only partially visible in FIG. 3).

The outer body 4 further comprises, in a position frontally adjacent to the driver area 6, a covering element 12 or dome, covering the dashboard 11 at the top, and a driving element 13 of the wind generated while the automobile 1 is travelling.

Figure 4:
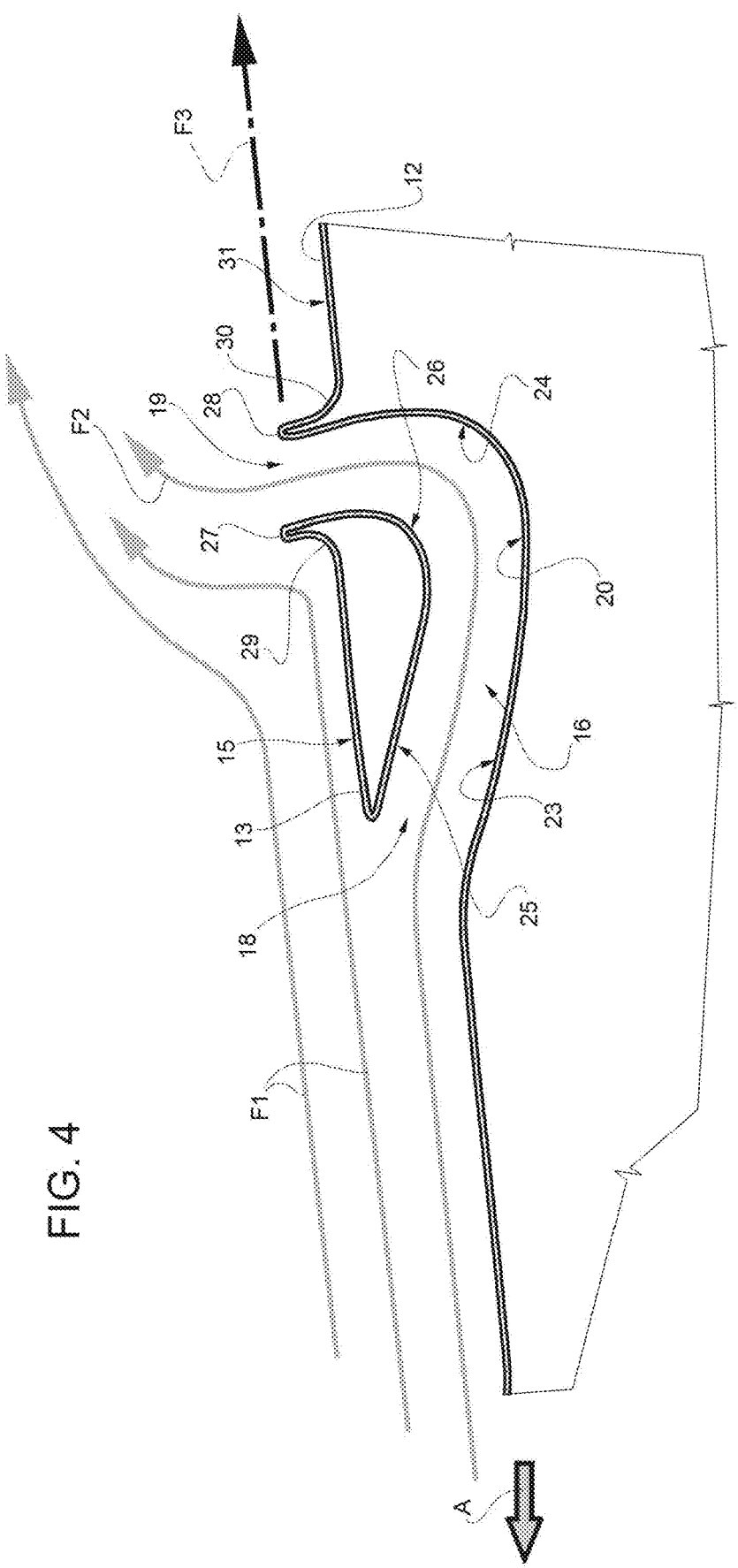
FIG. 4 shows on an enlarged scale the detail IV of FIG. 3.

With reference to FIGS. 2 to 4, the element 13 is arranged in front of the covering element 12 with refrence to the travelling direction A of the automobile 1 and is delimited at the top by a flow surface 15 that, while the automobile 1 is travelling, is touched by a main air flow F1 directed towards the driver area 6 in the direction opposite to the travelling direction A.

Advantageously, the outer body 4 comprises a flow channel 16 formed at the front of the driver area 6 and having an inlet opening 18 fed by the outside air while the automobile 1 is travelling and an outlet opening 19 facing upwards. The flow channel 16 extends in part at the bottom of the flow surface 15 to generate, while travelling, a secondary air flow F2 directed, at the outlet opening 19, transversely to the main flow F1 and incident on this latter to divert it upwards and avoid a direct impact of the main air flow F1 on the face of the driver in the driver area 6.

In particular, the outer body 4 comprises a recess 20 arranged in a position in front of the driver area 6 and below the element 13; the flow channel 16 is therefore delimited between the element 13 and the recess 20.

In practice, the element 13 defines a sort of bridge element, which extends above the recess 20 at a distance from this latter that is not null and has opposite side ends 21 joined to respective portions of the outer body 4. The element 13, and together with it the flow surface 15, are therefore interposed between the inlet and the outlet openings 18, 19 with reference to the travelling direction A of the automobile 1.

In the shown case, the flow surface 15 has an ascending ramp course towards the driver area 6, has a convex conformation upwards and extends in an arc between its opposite side ends.

With particular reference to FIGS. 3 and 4, the recess 20 is delimited by a descending ramp-shaped surface 23, extending towards the driver area 6 from the inlet opening 18, and by an ascending ramp-shaped surface 24, extending from the surface 23 to the outlet opening 19 and connected to the surface 23.

In practice, the surfaces 23 and 24 define together a curved concave profile. Near the outlet opening 19, the surface 24 has an almost vertical course, more precisely slightly inclined towards the front of the automobile 1 with respect to a vertical direction.

The element 13 is delimited at the bottom by two surfaces 25, 26 facing and parallel to the respective surfaces 23, 24 delimiting the recess 20.

As shown in FIGS. 3 and 4, the inlet opening 18 is facing at the front with reference to the travelling direction A of the automobile 1. In particular, the inlet opening 18 extends on a plane transverse to the travelling direction A; preferably, this plane is oblique with respect to the travelling direction A.

Advantageously, the outlet opening 19 is delimited on opposite sides respectively by a first and by a second protruding edge 27, 28 (commonly known as "nolder", or aerodynamic appendices) extending transversely to the travelling direction A of the automobile 1 and projecting upwards with respect to the flow surface 15; the protruding edge 27 is arranged in front of the protruding edge 28 with reference to the travelling direction A of the automobile 1.

The protruding edges 27, 28 define respective windbreaks for the main air flow F1 and cooperate with the secondary air flow F2 to divert the main air flow F1 upwards.

The protruding edge 27 extends from a rear end 29 of the flow surface 15 with reference to the travelling direction A of the automobile 1.

The protruding edge 28 extends instead from a front end 30 of a top finishing surface 31 of the covering element 12. In use, while the automobile 1 is travelling, a part of the wind generated by the motion heads towards the driver area, thus creating the main air flow F1, and a part enters through the inlet opening 18 the flow channel 16, thus generating the secondary air flow F2. This secondary air flow F2 is guided by the flow channel 16 towards the outlet opening 19 and exits from this latter in a direction transverse to the main air flow F1 and incident thereon. The secondary air flow F2 therefore produces a deflection or deviation of the main air flow F1 upwards so as to avoid a direct impact of the main air flow F1 on the face of the driver in the driver area 6.

The protruding edges 27, 28 formed on the outlet opening 19 cooperate with the secondary air flow F2 to increase the upwards deviation effect of the main air flow F1.

FIGS. 3 and 4 indicate in lines and points with F3 the direction that the air flow generated by the travel of the automobile 1 would have in the absence of the flow channel 16 and of the protruding edges 27 and 28. As shown, the air flow F3 would be directly incident on the face of the driver.

An examination of the characteristics of the automobile 1 made according to the present invention clearly shows the advantages it allows to obtain.

In particular, thanks to the flow channel 16, the travelling of the automobile 1 generates a secondary air flow F2 that diverts upwards the main air flow F1 directed towards the driver area 6 so as to avoid a direct impact of the main F1 air flow on the face of the driver.

In practice, the flow channel 16 allows a remarkable improvement of the comfort aboard automobiles without windshields, even at low speeds, by creating a sort of calm air bubble around the driver.

The secondary air flow F2 ultimately performs the same function as the absent windshield, with obvious advantages in terms of weight and costs if compared to the open automobiles that provide it.

Finally, it is clear that modifications and variations can be made to the automobile 1 here described and shown without thereby leaving the scope of protection defined by the appended claims.

The invention claimed is:

1. An open-top automobile (1) comprising an outer body (4) and a passenger compartment (5), obtained in said outer body (4) and including a driver area (6) open at the front with respect to a travelling direction (A) of the automobile (1), wherein said outer body (4) has, at least at the front of said driver area (6), a flow surface (15) that, while said automobile (1) is travelling, is touched by a main air flow (F1) directed towards the driver area (6) in a direction opposite to the travelling direction (A);

wherein said outer body (4) comprises at least a flow channel (16), obtained in front of said driver area (6) and having an inlet opening (18) that is fed by the outside air while the automobile (1) is travelling, and an outlet opening (19) facing upwards, said flow channel (16) extending, at least in part, at the bottom of said flow surface (15) for generating while travelling a secondary air flow (F2) directed, at said outlet opening (19) transversely to said main air flow (F1) and incident on this latter for diverting it upwards and avoiding a direct impact of said main air flow (F1) on the face of the driver in the driver area (6);

characterized in that said outer body (4) comprises a recess (20) in a position in front of said driver area (6) and a bridge element (13) extending above said recess (20) at a distance not null from the recess (20) itself; and in that said bridge element (13) has opposite side ends (22) joined to respective portions of the outer body (4) and is delimited at the top by said flow surface (15), wherein said flow surface (15) has an upwards convex conformation and extends in an arc shape between its own opposite side ends; and wherein said flow channel (16) is confined between said recess (20) and said bridge element (13).

2. The automobile according to claim 1, wherein said flow surface (15) is interposed between said inlet and outlet openings (18, 19) with reference to said travelling direction (A) of the automobile (1).

3. The automobile according to claim 1, wherein said outlet opening (19) is delimited on opposite sides, respectively by a first and by a second protruding edge (27, 28) extending transversely to said travelling direction (A) and protruding upwards with respect to said flow surface (15); and wherein said first protruding edge (27) is arranged in front of said second protruding edge (28) with reference to said travelling direction (A).

4. The automobile according to claim 3, wherein said first and second protruding edges (27, 28) define respective windbreakers for said main air flow (F1).

5. The automobile according to claim 4, wherein said first protruding edge (27) extends from a rear end (29) of said flow surface (15) with reference to said travelling direction (A).

6. The automobile according to claim 3, wherein said second protruding edge (28) extends from a front end (30) of a finishing surface (31) of said outer body (4), covering a dashboard (11) of said driver area (6).

7. The automobile according to claim 1, wherein said inlet opening (18) is facing at the front.

8. The automobile according to claim 1, wherein said inlet opening (18) extends on a plane transverse to said travelling direction (A).

9. The automobile according to claim 8, wherein said plane, on which said inlet opening (18) extends, is oblique with respect to said travelling direction (A).

10. The automobile according to claim 1, wherein said recess (20) is delimited by a first descending ramp-shaped surface (23), extending towards said driver area (6) from said inlet opening (18), and by a second ascending ramp-shaped surface (24) extending from said first surface (23) to said outlet opening (19) and connected to the first surface (23) itself.

11. The automobile according to claim 10, wherein said bridge element (13) is delimited at the bottom by a third and by a fourth surface (25, 26) facing and parallel to respective first and second surfaces (23, 24) delimiting said recess (20).

12. The automobile according to claim 1, wherein said flow surface (15) has a ramp course ascending towards said driver area (6).

* * * * *